United States Patent
Brule

(10) Patent No.: US 7,717,139 B2
(45) Date of Patent: May 18, 2010

(54) POLYAMIDE/POLYOLEFIN BLENDS CONTAINING CARBON NANOTUBES

(75) Inventor: Benoit Brule, Bernay (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 10/780,832

(22) Filed: Feb. 18, 2004

(65) Prior Publication Data

US 2005/0131147 A1    Jun. 16, 2005

(30) Foreign Application Priority Data

Feb. 18, 2003    (FR) .................................. 03 01933

(51) Int. Cl.
*F16L 11/04*    (2006.01)
*B32B 1/08*    (2006.01)

(52) U.S. Cl. .................... 138/137; 138/140; 138/141; 138/145; 138/146; 428/35.7; 428/35.9; 428/36.6; 428/36.7; 428/36.9; 428/36.91; 428/474.4; 428/474.7; 428/474.9; 428/475.5; 428/475.8; 428/476.1; 428/476.3; 428/476.9

(58) Field of Classification Search ............. 428/35.7, 428/35.9, 36.6, 36.7, 36.9, 36.91, 474.4, 428/474.7, 474.9, 475.5, 475.8, 476.1, 476.3, 428/476.9; 138/137, 140, 141, 145, 146; 524/495, 496, 538
See application file for complete search history.

(56) References Cited

U.S. PATENT DOCUMENTS 5,376,712 A * 12/1994 Nakajima .................... 524/492
6,090,459 A    7/2000 Jadamus et al.
6,331,265 B1 * 12/2001 Dupire et al. ............. 264/289.3
6,572,997 B1 * 6/2003 Iqbal et al. .................... 429/34
6,608,133 B2 * 8/2003 Kurasawa et al. ........... 524/496
6,615,877 B2 * 9/2003 Zimmer et al. .............. 138/137

FOREIGN PATENT DOCUMENTS

EP    470606    8/1991

* cited by examiner

*Primary Examiner*—Ana L Woodward
(74) *Attorney, Agent, or Firm*—Thomas F. Roland

(57) ABSTRACT

The present invention relates to polyamide/polyolefin blends containing carbon nanotubes. The invention also relates to structures comprising at least one layer of these blends and optionally at least one layer of another material. These structures may be in the form of bottles, tanks, containers, hoses, pipes and vessels of any kind. These structures may be manufactured using the standard techniques for thermoplastics, such as injection moulding, extrusion-blow moulding and coextrusion. The present invention, according to one embodiment, relates to a multilayer tube comprising, in its radial direction from the outside inwards:

an outer layer (1) form from a polyamide chosen from PA-11 and PA-12;
a layer (2) formed from a tie;
an optional layer (3) formed from an EVOH;
optionally, a tie layer (this does not exist if no layer (3) is present);
an inner layer (4) formed from a polyamide (A)/polyolefin (B) blend having a polyamide matrix and containing carbon nanotubes; with the layers being successive and adhering to one another in their respective areas of contact.

14 Claims, 1 Drawing Sheet

POLYAMIDE/POLYOLEFIN BLENDS CONTAINING CARBON NANOTUBES

FIELD OF THE INVENTION

The present invention relates to polyamide/polyolefin blends containing carbon nanotubes. These blends are useful for manufacturing monolayer or multilayer tubes for transferring fluids.

As examples of tubes for transferring fluids, mention may be made of fuel tubes, and in particular those for taking fuel from the tank to the engine of motor vehicles. As other examples of transferring fluids, mention may be made of fluids used in fuel cells, $CO_2$-based cooling and conditioned-air systems, hydraulic systems, cooling circuits, conditioned air and medium-pressure power transfer systems.

For safety and environmental reasons, motor vehicle manufacturers require these tubes to have not only mechanical properties, such as burst strength and flexibility with good impact strength both at cold (−40° C.) and at high temperature (125° C.) but also very low permeability to hydrocarbons and to their additives, particularly to alcohols such as methanol and ethanol. These tubes must also have good resistance to engine fuels and lubricating oils.

In motor vehicles, petrol flows under the action of the injection pump at high speed in the lines connecting the engine to the tank. In certain cases, friction between the fuel and the internal wall of the tube may generate electrostatic charges, the accumulation of which may result in an electrical discharge (spark) capable of igniting the petrol with catastrophic consequences (an explosion). It is therefore necessary to make the inner surface of the tube in contact with the petrol conductive.

These tubes are manufactured by coextruding the various layers using the standard techniques for thermoplastics.

It has been discovered that these polyamide/polyolefin blends containing carbon nanotubes have both good barrier properties and antistatic properties.

BACKGROUND OF THE INVENTION

Patent EP 470 606 discloses tubes having an antistatic polyamide layer. This antistatic layer consists of a polyamide filled with 20% by weight of carbon black. An antistatic layer is indeed obtained, however the incorporation of 20% carbon black increases the flexural modulus of the polyamide and the tube can no longer pass the impact tests.

The advantage of carbon nanotubes is that it is sufficient to incorporate 2 to 6% by weight of them into the polyamide in order to make it antistatic and at this content the polyamide retains its mechanical properties. In particular, a tube comprising this layer is not weakened and it passes the impact tests. Patent U.S. Pat. No. 6,090,459 discloses tubes comprising layers of nylon-12 (PA-12) and/or PVDF and also comprising an antistatic PA-12 or PVDF layer. These antistatic layers are obtained by incorporating crystalline graphite fibres having a diameter of around 10 nanometers into the PA-12 or PVDF. The proportion of these fibres in the PA-12 or PVDF is between 3 and 5% by weight.

This solution provides a technical advantage over the above prior art EP 470 606, however the cost of these fibres is high. It has now been found that, in polyamide/polyolefin blends containing carbon nanotubes, the latter concentrate in the polyamide. Thus, a polyamide/polyolefin blend containing carbon nanotubes having a polyamide matrix has the same antistatic properties as a polyamide blend containing carbon nanotubes; but by containing much fewer carbon nanotubes, it is therefore less expensive. In addition, these polyamide/polyolefin blends containing carbon nanotubes form a much greater barrier to alcohol-containing fuels than polyamide/polyolefin blends not containing carbon nanotubes.

SUMMARY OF THE INVENTION

The present invention relates to polyamide (A)/polyolefin (B) blends containing carbon nanotubes.

Advantageously, the proportion of carbon nanotubes is sufficient for the surface resistivity to be of the order of $10^6$ to $10^7$ Ω.

The invention also relates to structures comprising at least one layer of these blends and optionally at least one layer of another material. These structures may be in the form of bottles, tanks, containers, hoses, pipes and vessels of any kind. These structures may be manufactured using the standard techniques for thermoplastics, such as injection moulding, extrusion-blow moulding and coextrusion.

The present invention, according to one embodiment, relates to a multilayer tube comprising, in its radial direction from the outside inwards:
  an outer layer (1) formed from a polyamide chosen from PA-11 and PA-12;
  a layer (2) formed from a tie;
  an optional layer (3) formed from an EVOH;
  optionally, a tie layer (this does not exist if no layer (3) is present);
  an inner layer (4) formed from a polyamide (A)/polyolefin (B) blend having a polyamide matrix and containing carbon nanotubes;
  the layers being successive and adhering to one another in their respective areas of contact.

According to a variant, the layer (4) is replaced with a layer (4a) and a layer (5), such that:
  the layer (4a) is formed from a polyamide (A1) or a polyamide (A)/polyolefin (B) blend having a polyamide matrix but does not contain carbon nanotubes;
  the layer (5) is placed on the inside of the tube and is formed from a polyamide (A)/polyolefin (B) blend having a polyamide matrix and contains carbon nanotubes;
  an optional tie layer being placed between the layers (4a) and (5).

That is to say, according to this variant, the invention relates to a multilayer tube comprising, in its radial direction from the outside inwards:
  an outer layer (1) formed from a polyamide chosen from PA-11 and PA-12;
  a layer (2) formed from a tie;
  an optional layer (3) formed from an EVOH;
  optionally, a tie layer (this does not exist if no layer (3) is present);
  a layer (4a) formed from a polyamide (A1) or a polyamide (A)/polyolefin (B) blend having a polyamide matrix and not containing carbon nanotubes;
  optionally, a tie layer;
  a layer (5) placed on the inside of the tube and formed from a polyamide (A)/polyolefin (B) blend having a polyamide matrix and containing carbon nanotubes;
  the layers being successive and adhering to one another in their respective areas of contact.

Advantageously, the proportion of carbon nanotubes is sufficient for the surface resistivity of the inner layer (the layer in contact with the transported fluid) of the tubes to be of the order of $10^6$ to $10^7$ Ω.

DETAILED DESCRIPTION OF THE INVENTION

Figure 1:
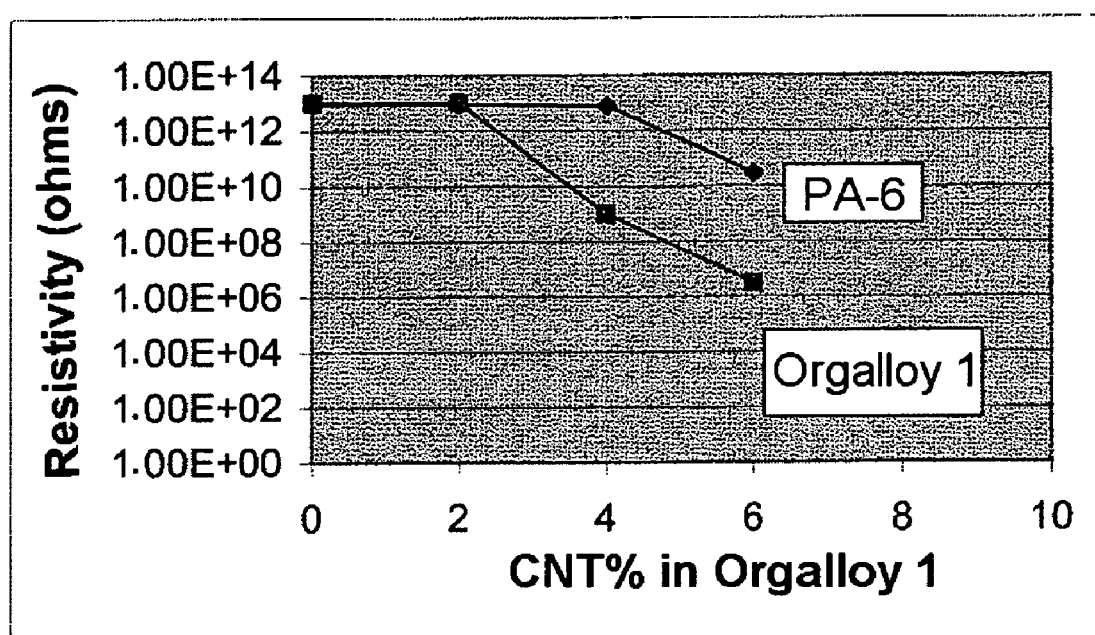
FIG. 1 is a plot of the surface resistivity comparing Orgalloy 1 with PA-6 from the Example

With regard to the polyamide (A)/polyolefin (B) blend containing carbon nanotubes, the term "polyamide" is understood to mean products resulting from the condensation:

- of one or more amino acids, such as aminocaproic, 7-aminoheptanoic, 11-aminoundecanoic and 12-aminododecanoic acids or of one or more lactams, such as caprolactam, oenantholactam and lauryllactam;
- of one or more salts or mixtures of diamines, such as hexamethylenediamine, dodecamethylenediamine, metaxylylenediamine, bis-p(aminocyclohexyl)methane and trimethylhexamethylenediamine with diacids such as isophthalic, terephthalic, adipic, azelaic, suberic, sebacic and dodecanedicarboxylic acids.

By way of examples of a polyamide, mention may be made of PA-6 and PA-6,6.

It is also advantageous to use copolyamides. Mention may be made of the copolyamides resulting from the condensation of at least two alpha,omega-aminocarboxylic acids or of two lactams or of a lactam and of an alpha,omega-aminocarboxylic acid. Mention may also be made of the copolyamides resulting from the condensation of at least one alpha,omega-aminocarboxylic acid (or a lactam), at least one diamine and at least one dicarboxylic acid.

By way of examples of lactams, mention may be made of those having from 3 to 12 carbon atoms in the main ring and possibly being substituted. Mention may be made, for example, of β,β-dimethylpropriolactam, α,α-dimethylpropriolactam, amylolactam, caprolactam, capryllactam and lauryllactam.

By way of examples of alpha,omega-aminocarboxylic acids, mention may be made of aminoundecanoic acid and aminododecanoic acid. By way of examples of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH.

The diamine may be an aliphatic diamine having from 6 to 12 carbon atoms or it may be an aryl diamine and/or a saturated cyclic diamine. By way of examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4 aminocyclohexyl)methane (BMACM).

By way of examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA-6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-aminoundecanoic acid, adipic acid and hexamethylenediamine (PA-6/6,6/11/12) and copolymers of lauryllactam, azelaic acid and hexamethylenediamine (PA-6,9/12).

Advantageously, the copolyamide is chosen from PA-6/12 and PA-6/6,6.

It is possible to use polyamide blends. Advantageously, the relative viscosity of the polyamides, measured as a 1% solution in sulphuric acid at 20° C., is between 1.5 and 5.

It would not be outside the scope of the invention to replace part of polyamide (A) with a copolymer having polyamide blocks and polyether blocks, that is to say by using a blend comprising at least one of the above polyamides with at least one copolymer having polyamide blocks and polyether blocks.

The copolymers having polyamide blocks and polyether blocks result from the copolycondensation of polyamide blocks having reactive ends with polyether blocks having reactive ends, such as, inter alia:

1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated alpha,omega-polyoxyalkylene blocks called polyetherdiols;
3) polyamide blocks having dicarboxylic chain ends with polyetherdiols, the products obtained being, in this particular case, polyetheresteramides. Advantageously, these copolymers are used.

Polyamide blocks having dicarboxylic chain ends derive, for example, from the condensation of alpha,omega-aminocarboxylic acids, of lactams or of dicarboxylic acids and diamines in the presence of a chain-stopping dicarboxylic acid.

The polyether may, for example, be a polyethylene glycol (PEG), a polypropylene glycol (PPG) or a polytetramethylene glycol (PTMG). The latter is also called polytetrahydrofuran (PTHF).

The number-average molar mass $\overline{M}_n$ of the polyamide blocks is between 300 and 15000 and preferably between 600 and 5000. The mass $\overline{M}_n$ of the polyether blocks is between 100 and 6000 and preferably between 200 and 3000.

Polymers having polyamide blocks and polyether blocks may also include randomly distributed units. These polymers may be prepared by the simultaneous reaction of the polyether and polyamide-block precursors.

For example, it is possible to react a polyetherdiol, a lactam (or an alpha,omega-amino acid) and a chain-stopping diacid in the presence of a small amount of water. A polymer is obtained having essentially polyether blocks and polyamide blocks of very variable length, but also the various reactants, having reacted in a random fashion, which are distributed randomly along the polymer chain.

These polymers having polyamide blocks and polyether blocks, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in meta-cresol at 25° C. for an initial concentration of 0.8 g/100 ml. The MFIs may be between 5 and 50 (235° C., with a load of 1 kg).

The polyetherdiol blocks are either used as such and copolycondensed with polyamide blocks having carboxylic ends or they are aminated in order to be converted into polyetherdiamines and condensed with polyamide blocks having carboxylic ends. They may also be mixed with polyamide precursors and a chain stopper in order to make polyamide-block polyether-block polymers having randomly distributed units.

Polymers having polyamide and polyether blocks are described in U.S. Pat. Nos. 4,331,786, 4,115,475, 4,195,015, 4,839,441, 4,864,014, 4,230,838 and 4,332,920.

The ratio of the amount of copolymer having polyamide blocks and polyether blocks to the amount of polyamide is, by weight, advantageously between 10/90 and 60/40. Mention may be made, for example, of blends of (i) PA-6 and (ii) copolymers having PA-6 blocks and PTMG blocks and blends of (i) PA-6 and (ii) copolymers having PA-12 blocks and PTMG blocks.

Advantageously, PA-6, PA-6,6 and PA-6/6,6 are used.

As regards polyolefin (B) of the polyamide (A)/polyolefin (B) blend, this may or may not be functionalized or it may be a blend of at least one functionalized polyolefin and/or at least one unfunctionalized polyolefin. To simplify matters, functionalized polyolefins will be described below as (B1) and unfunctionalized polyolefins as (B2).

An unfunctionalized polyolefin (B2) is conventionally a homopolymer or a copolymer of alpha-olefins or diolefins, such as, for example, ethylene, propylene, 1-butene, 1-octene and butadiene. By way of examples, mention may be made of:
- ethylene homopolymers and copolymers, particularly LDPE, HDPE, LLDPE (linear low-density polyethylene) or VLDPE (very low-density polyethylene) and metallocene polyethylene;
- propylene homopolymers and copolymers;
- ethylene/alpha-olefin copolymers such as ethylene/propylene copolymers; EPRs (abbreviation for ethylene-propylene rubbers); and ethylene/propylene/diene copolymers (EPDM);
- styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS);
- copolymers of ethylene with at least one product chosen from salts or esters of unsaturated carboxylic acids such as alkyl (meth)acrylate (for example methyl acrylate), or vinyl esters of saturated carboxylic acids such as vinyl acetate (EVA), the proportion of comonomer possibly being as much as 40% by weight.

The functionalized polyolefin (B1) may be an alpha-olefin polymer having reactive units (the functional groups); such reactive units are acid, anhydride or epoxy functional groups. By way of example, mention may be made of the above polyolefins (B2) which are grafted or are copolymerized or terpolymerized with unsaturated epoxides such as glycidyl (meth)acrylate, or with carboxylic acids or the corresponding salts or esters, such as (meth)acrylic acid (this possibly being completely or partially neutralized by metals such as Zn, etc.) or else with carboxylic acid anhydrides such as maleic anhydride. A functionalized polyolefin is, for example, a PE/EPR blend, the weight ratio of which may vary between wide limits, for example between 40/60 and 90/10, the said blend being cografted with an anhydride, especially maleic anhydride, with a degree of grafting, for example, of 0.01 to 5% by weight.

The functionalized polyolefin (B1) may be chosen from the following (co)polymers, grafted with maleic anhydride or glycidyl methacrylate, in which the degree of grafting is, for example, from 0.01 to 5% by weight:
- PE, PP, copolymers of ethylene with propylene, butene, hexene or octene and containing, for example, from 35 to 80% by weight of ethylene;
- ethylene/alpha-olefin copolymers such as ethylene/propylene copolymers; EPRs (abbreviation for ethylene-propylene rubbers); and ethylene/propylene/diene copolymers (EPDM);
- styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS);
- ethylene/vinyl acetate copolymers (EVA), containing up to 40% by weight of vinyl acetate;
- ethylene/alkyl (meth)acrylate copolymers, containing up to 40% by weight of alkyl (meth)acrylate;
- ethylene/vinyl acetate (EVA)/alkyl (meth)acrylate terpolymers, containing up to 40% by weight of comonomers.

The functionalized polyolefin (B1) may also be chosen from ethylene/propylene copolymers containing predominantly propylene, these being grafted with maleic anhydride and then condensed with monoaminated polyamide (or a polyamide oligomer) (products described in EP-A-0 342 066).

The functionalized polyolefin (B1) may also be a copolymer or terpolymer of at least the following units: (1) ethylene, (2) an alkyl (meth)acrylate or a vinyl ester of a saturated carboxylic acid and (3) an anhydride such as maleic anhydride or a (meth)acrylic acid or an epoxy such as glycidyl (meth)acrylate.

By way of examples of functionalized polyolefins of this latter type, mention may be made of the following copolymers, in which the ethylene preferably represents at least 60% by weight and in which the termonomer (the functional group) represents, for example, from 0.1 to 10% by weight of the copolymer:
- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth) acrylic acid or maleic anhydride or glycidyl methacrylate copolymers.

In the above copolymers, the (meth)acrylic acid may be salified with Zn or Li.

The term "alkyl (meth)acrylate" in (B1) or (B2) denotes $C_1$ to $C_8$ alkyl methacrylates and acrylates, and may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Moreover, the aforementioned polyolefins (B1) may also be crosslinked by any suitable process or agent (diepoxy, diacid, peroxide, etc.); the term functionalized polyolefin also includes blends of the aforementioned polyolefins with a difunctional reactive agent such as a diacid, dianhydride, diepoxy, etc., which is capable of reacting with them or blends of at least two functionalized polyolefins able to react together.

The copolymers mentioned above, (B1) and (B2), may be copolymerized so as to form random or block copolymers and may have a linear or branched structure.

The molecular weight, the MFI index and the density of these polyolefins may also vary over a wide range, as those skilled in the art will appreciate. MFI is the abbreviation for Melt Flow Index. It is measured according to the ASTM 1238 standard.

Advantageously, the unfunctionalized polyolefins (B2) are chosen from propylene homopolymers or copolymers and any ethylene homopolymer or copolymer of ethylene and a comonomer of higher alpha-olefin type, such as butene, hexene, octene or 4-methyl-1-pentene. Mention may be made, for example, of high-density PP and PE, medium-density PE, linear low-density PE, low-density PE and very low-density PE. These polyethylenes are known to those skilled in the art as being produced by a "radical" process, by "Ziegler"-type catalysis or, more recently, by so-called "metallocene" catalysis.

Advantageously, the functionalized polyolefins (B1) are chosen from any polymer comprising alpha-olefin units and units carrying polar reactive functional groups such as epoxy, carboxylic acid or carboxylic acid anhydride functional groups. By way of examples of such polymers, mention may be made of ethylene/alkyl acrylate/maleic anhydride or ethylene/alkyl acrylate/glycidyl methacrylate terpolymers, such as the LOTADER® polymers from the Applicant, or maleic-anhydride-grafted polyolefins such as the OREVAC® polymers from the Applicant, as well as ethylene/alkyl acrylate/(meth)acrylic acid terpolymers. Mention may also be made of polypropylene homopolymers and copolymers grafted with a carboxylic acid anhydride and then condensed with polyamides or monoaminated polyamide oligomers.

The MFI of (A) and the MFIs of (B1) and (B2) may be chosen within a wide range; however, it is recommended, in order to facilitate the dispersion of (B), that the MFI of (A) be greater than that of (B).

For small proportions of (B), for example 10 to 15 parts, it is sufficient to use an unfunctionalized polyolefin (B2). The proportion of (B2) and (B1) in the (B) phase depends on the amount of functional groups present in (B1) and on their reactivity. Advantageously, (B1)/(B2) weight ratios ranging from 5/35 to 15/25 are used. It is also possible to use only a blend of polyolefins (B1) in order to obtain crosslinking.

Advantageously, the polyamide (A)/polyolefin (B) blend containing carbon nanotubes has a polyamide matrix. Usually, it is sufficient for the proportion of polyamide of the polyamide (A)/polyolefin (B) blend containing carbon nanotubes to be at least 40% and preferably between 40 and 75% by weight so that there is a polyamide matrix. This is the case for the first three preferred embodiments of the polyamide/polyolefin blend. In the fourth preferred embodiment, the polyolefin phase is crosslinked, which ensures that there is no phase inversion and that the blend remains with a polyamide matrix.

According to a first preferred embodiment of the invention, the polyolefin (B) comprises (i) a high-density polyethylene (HDPE) and (ii) a blend of a polyethylene (C1) and a polymer (C2) chosen from elastomers, very low-density polyethylenes and ethylene copolymers, the (C1)+(C2) blend being cografted with an unsaturated carboxylic acid or an unsaturated carboxylic acid anhydride.

According to a variant of this first embodiment of the invention, the polyolefin (B) comprises (i) a high-density polyethylene (HDPE), (ii) a polymer (C2) chosen from elastomers, very low-density polyethylenes and ethylene copolymers, (C2) being grafted with an unsaturated carboxylic acid or an unsaturated carboxylic acid anhydride and (iii) a polymer (C'2) chosen from elastomers, very low-density polyethylenes and ethylene copolymers.

According to a second preferred embodiment of the invention, the polyolefin (B) comprises (i) polypropylene and (ii) a polyolefin which results from the reaction of a polyamide (C4) with a copolymer (C3) comprising propylene and an unsaturated monomer X, grafted or copolymerized.

According to a third preferred embodiment of the invention, the polyolefin (B) comprises (i) a polyethylene of the EVA, LLDPE, VLDPE or metallocene type and (ii) an ethylene/alkyl (meth)acrylate/maleic anhydride copolymer.

According to a fourth preferred embodiment of the invention, the polyolefin comprises two functionalized polymers containing at least 50 mol % of ethylene units and able to react in order to form a crosslinked phase. According to a variant, the polyamide (A) is chosen from blends of (i) a polyamide and (ii) a copolymer having PA-6 blocks and PTMG blocks and blends of (i) a polyamide and (ii) a copolymer having PA-12 blocks and PTMG blocks, the weight ratio of the amount of copolymer to the amount of polyamide being between 10/90 and 60/40.

With regard to the first embodiment, the proportions (by weight) are advantageously the following:
60 to 70% of polyamide,
5 to 15% of the cografted blend of (C1) and (C2),
the balance being high-density polyethylene.

With regard to the high-density polyethylene, its density is advantageously between 0.940 and 0.965 and the MFI between 0.1 and 5 g/10 min (190° C./2.16 kg).

The polyethylene (C1) may be chosen from the abovementioned polyethylenes. Advantageously, (C1) is a high-density polyethylene (HDPE) having a density between 0.940 and 0.965. The MFI of (C1) is between 0.1 and 3 g/10 min (190° C./2.16 kg).

The copolymer (C2) may, for example, be an ethylene-propylene elastomer (EPR) or ethylene/propylene/diene elastomer (EPDM). (C2) may also be a very low-density polyethylene (VLDPE) which is either an ethylene homopolymer or an ethylene/alpha-olefin copolymer. (C2) may also be a copolymer of ethylene with at least one product chosen from (i) unsaturated carboxylic acids, their salts and their esters, (ii) vinyl esters of saturated carboxylic acids and (iii) unsaturated dicarboxylic acids, their salts, their esters, their half-esters and their anhydrides. Advantageously, (C2) is an EPR.

Advantageously, 60 to 95 parts of (C1) per 40 to 5 parts of (C2) are ududgBse

The blend of (C1) and (C2) is grafted with an unsaturated carboxylic acid, that is to say (C1) and (C2) are cografted. It would not be outside the scope of the invention to use a functional derivative of this acid. Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids.

Unsaturated dicarboxylic acids having 4 to 10 carbon atoms and their functional derivatives, particularly their anhydrides, are particularly preferred grafting monomers. These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]-hept-5-ene-2,3-dicarboxylic and x-methylbicyclo[2.2.1]-hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides. Advantageously, maleic anhydride is used.

Various known processes can be used to graft a grafting monomer onto the blend of (C1) and (C2). For example, this may be achieved by heating the polymers (C1) and (C2) to a high temperature, about 150° C. to about 300° C., in the presence or absence of a solvent and with or without a radical initiator.

In the graft-modified blend of (C1) and (C2) obtained in the abovementioned manner, the amount of grafting monomer may be chosen appropriately, but it is preferably from 0.01 to 10% and better still from 600 ppm to 2%, with respect to the weight of cografted (C1)+(C2). The amount of grafted monomer is determined by assaying the succinic functional groups by FTIR spectroscopy. The MFI (190° C./2.16 kg) of the cografted (C1)+(C2) is 5 to 30 and preferably 13 to 20 g/10 min.

Advantageously, the cografted (C1)+(C2) blend is such that the $MFI_{10}/MFI_2$ ratio is greater than 18.5, $MFI_{10}$ denoting the melt flow index at 190° C. with a load of 10 kg and $MFI_2$ denoting the melt flow index with a load of 2.16 kg. Advantageously, the $MFI_{20}$ of the blend of the cografted polymers (C1) and (C2) is less than 24. $MFI_{20}$ denotes the melt flow index at 190° C. with a load of 21.6 kg.

With regard to the variant of the first embodiment, the proportions (by weight) are advantageously the following:
60 to 70% of polyamide,
5 to 10% of grafted (C2),
5 to 10% of (C'2),
the balance being high-density polyethylene.

Advantageously, (C2) is an EPR or an EPDM. Advantageously, (C'2) is an EPR containing 70 to 75% ethylene by weight.

With regard to the second embodiment of the invention, the proportions (by weight) are advantageously the following:
60 to 70% of polyamide,
20 to 30% of polypropylene,
3 to 10% of a polyolefin which results from the reaction of a polyamide (C4) with a copolymer (C3) comprising propylene and an unsaturated monomer X, grafted or copolymerized.

The MFI (230° C./2.16 kg) of the polypropylene is advantageously less than 0.5 g/10 min and preferably between 0.1 and 0.5 g/10 min. Such products are described in EP 647 681.

The grafted product of this second embodiment of the invention will now be described. Firstly (C3) is prepared, this being either a copolymer of propylene and an unsaturated monomer X, or a polypropylene onto which an unsaturated monomer X is grafted. X is any unsaturated monomer that can be copolymerized with propylene or grafted onto polypropylene and having a functional group capable of reacting with a polyamide. This functional group may, for example, be a carboxylic acid, a dicarboxylic acid anhydride or an epoxide. As examples of monomer X, mention may be made of (meth)acrylic acid, maleic anhydride and unsaturated epoxides such as glycidyl (meth)acrylate. Advantageously, maleic anhydride is used. With regard to the grafted polypropylenes, X may be grafted onto polypropylene homopolymers or copolymers, such as ethylene/propylene copolymers consisting predominantly (in moles) of propylene. Advantageously, (C3) is such that X is grafted. The grafting is an operation known per se.

(C4) is a polyamide or a polyamide oligomer. Polyamide oligomers are described in EP 342 066 and FR 2 291 225. The polyamides (or oligomers) (C4) are products resulting from the condensation of the abovementioned monomers. Polyamide blends may be used. It is advantageous to use PA-6, PA-11, PA-12, a copolyamide having PA-6 units and PA-12 units (PA-6/12) and a copolyamide based on caprolactam, hexamethylenediamine and adipic acid (PA-6/6,6). The polyamides or oligomers (C4) may have acid, amine or monoamine terminal groups. In order for the polyamide to have a monoamine terminal group, all that is required is to use a chain stopper of formula:

in which:
R₁ is hydrogen or a linear or branched alkyl group containing up to 20 carbon atoms;
R₂ is a linear or branched, alkyl or alkenyl group having up to 20 carbon atoms, a saturated or unsaturated cycloaliphatic radical, an aromatic radical or a combination of the above. The chain stopper may, for example, be laurylamine or oleylamine.

Advantageously, (C4) is a PA-6, a PA-11 or a PA-12. The proportion by weight of (C4) in (C3)+(C4) is advantageously between 0.1 and 60%. The reaction of (C3) with (C4) preferably takes place in the melt state. For example, it is possible to mix (C3) and (C4) in an extruder at a temperature generally between 230 and 250° C. The average residence time of the melt in the extruder may be between 10 seconds and 3 minutes and preferably between 1 and 2 minutes.

With regard to the third embodiment, the proportions (by weight) are advantageously the following:
60 to 70% of polyamide,
5 to 15% of an ethylene/alkyl (meth)acrylate/maleic anhydride copolymer,
the balance being a polyethylene of the EVA, LLDPE, VLDPE or metallocene type; advantageously, the density of the LLDPE, VLDPE or metallocene polyethylene is between 0.870 and 0.925, and the MFI is between 0.1 et 5 (190° C./2.16 kg).

Advantageously, the ethylene/alkyl (meth)acrylate/maleic anhydride copolymers contain from 0.2 to 10% by weight of maleic anhydride and up to 40% and preferably 5 to 40% by weight of alkyl (meth)acrylate. Their MFIs are between 2 and 100 (190° C./2.16 kg). The alkyl (meth)acrylates have already been described above. The melting point is between 80 and 120° C. These copolymers are commercially available. They are produced by radical polymerization at a pressure that may be between 200 and 2500 bar.

With regard to the fourth embodiment, the proportions (by weight) are advantageously the following:
35 to 95% of a polyamide,
65 to 5% of a blend of an ethylene/alkyl (meth)acrylate/maleic anhydride copolymer and of an ethylene/alkyl (meth)acrylate/glycidyl (meth)acrylate copolymer.

Advantageously, the ethylene/alkyl (meth)acrylate/maleic anhydride copolymers contain from 0.2 to 10% by weight of maleic anhydride and up to 40%, and preferably 5 to 40%, by weight of alkyl (meth)acrylate. Their MFIs are between 2 and 100 (190° C./2.16 kg). The alkyl (meth)acrylates have already been described above. The melting point is between 80 and 120° C. These copolymers are commercially available. They are produced by radical polymerization at a pressure that may be between 200 and 2500 bar.

The ethylene/alkyl (meth)acrylate/glycidyl methacrylate copolymer may contain up to 40%, advantageously 5 to 40%, by weight of alkyl (meth)acrylate and up to 10%, preferably 0.1 to 8%, by weight of unsaturated epoxide.

Advantageously, the alkyl (meth)acrylate is chosen from methyl (meth)acrylate, ethyl acrylate, n-butyl acrylate, isobutyl acrylate and 2-ethylhexyl acrylate. The amount of alkyl (meth)acrylate is preferably from 20 to 35%. The MFI is advantageously between 5 and 100 g/10 min (190° C./2.16 kg) and the melting point is between 60 and 110° C. This copolymer can be obtained by radical polymerization of the monomers.

It is possible to add catalysts for accelerating the reaction between the epoxy and anhydride functional groups; among the compounds capable of accelerating the reaction between the epoxy functional group and the anhydride functional group, mention may be made in particular of:

tertiary amines, such as dimethyllaurylamine, dimethylstearylamine, N-butylmorpholine, N,N-dimethylcyclohexylamine, benzyldimethylamine, pyridine, dimethylamino-4-pyridine, 1-methylimidazole, tetramethylethylhydrazine, N,N-dimethylpiperazine, N,N,N',N'-tetramethyl-1,6-hexanediamine, a blend of tertiary amines having from 16 to 18 carbon atoms and known as dimethyltallowamine;

tertiary phosphines, such as triphenylphosphine;

zinc alkyldithiocarbamates; and acids.

It would not be outside the scope of the invention if part of the ethylene/alkyl (meth)acrylate/maleic anhydride copolymer were to be replaced with an ethylene/acrylic acid copolymer or an ethylene/maleic anhydride copolymer, the maleic anhydride having been completely or partly hydrolysed. These copolymers may also comprise an alkyl (meth)acrylate. This part may represent up to 30% of the ethylene/alkyl (meth)acrylate/maleic anhydride copolymer.

With regard to the carbon nanotubes, these are thus tubes or hollow fibres having a diameter of around 5 to 20 nanometers (nm) and a length of the order of 100 to 1000 times the diameter.

Carbon possesses three well-known allotropic forms, namely amorphous carbon, graphite and diamond. Graphite is found in carbon fibres, which are very light and strong. Diamond is commonly used for its exceptional mechanical properties and for its high thermal conductivity. Carbon nanotubes, a novel allotropic form of carbon, are considered as a unique species of carbon systems lying mid-way between conventional carbon fibres and the new forms of carbon such as the fullerenes. Their length/diameter ratio is so large that they can be considered, as regards certain properties, as being one-dimensional structures. Two types of carbon nanotubes exist, namely single-walled and multiwalled nanotubes, with:

diameter: a few nanometers in the case of single-walled nanotubes and of the order of 10 to several tens of nanometers in the case of multiwalled nanotubes;

length: several microns.

A single-walled carbon nanotube, if it is perfect, may be defined as a graphene sheet rolled up and closed on itself, thus forming a cylinder consisting only of carbon atoms. The ends are formed from two carbon hemispheres.

A multiwalled nanotube is a concentric stack of single-walled nanotubes.

These nanotubes can be manufactured using two methods. The physical methods consist in subliming a graphite anode, under special conditions (controlled pressure, presence of a catalyst and of a specific gas in the chamber, etc.). The energy needed for sublimation may be provided in various forms: a current, a laser, solar energy, etc. The most common method at the present time is that using an electric arc, which consists in applying a voltage in order to sublime a bar containing graphite and particles of metal catalysts. Currently, this method produces relatively large amounts of material with a very high structural quality (the mechanical, electrical and thermal properties of the material are therefore very good). However, carbon and metallic impurities remain between the bundles of carbon nanotubes. These impurities can be removed by purification processes.

The chemical or soft methods consist in decomposing a hydrocarbon gas over metal molecules. This process makes it possible to obtain larger amounts of nanotubes, but with a higher level of defects. Consequently, the properties are usually less beneficial than those of nanotubes produced by the electric arc method.

It is possible to use, for example, the nanotubes manufactured by Hyperion Catalysis International® and described in "Plastics Additives and Compounding", September 01, Volume 3, issue 9, ISSN 1464-391X (Elsevier).

With regard to the proportion of carbon nanotubes in the polyamide/polyolefin blend, this may have any value. The higher this proportion, the better the barrier and antistatic properties. Advantageously, this proportion by weight is between 0.1 and 10% per 99.9 to 90% of the polyamide/polyolefin blend, respectively. More advantageously, this proportion by weight is between 1 and 7% per 99 to 93% of the polyamide/polyolefin blend, respectively. Preferably, this proportion by weight is between 2 and 6% per 98 to 94% of the polyamide/polyolefin blend, respectively. It would not be outside the scope of the invention to use a mixture of carbon nanotubes.

The compositions according to the invention may furthermore contain at least one additive chosen from:

dyes;

pigments;

whiteners;

antioxidants;

UV stabilizers.

The compositions of the invention are prepared by blending all the ingredients (A, B, nanotubes and optional additive) in a "direct" process or by adding the nanotubes and the optional additive to the A/B blend already prepared, or else by mixing a polyamide (A) already containing nanotubes with a polyolefin (B), or any combination of these possibilities.

Advantageously, standard blending and mixing machines from the thermoplastics industry may be used, such as extruders and mixers, for example Buss® Co-Kneaders.

The present invention, according to one particular embodiment, relates to a multilayer tube comprising, in its radial direction from the outside inwards:

an outer layer (1) formed from a polyamide chosen from PA-11 and PA-12;

a layer (2) formed from a tie;

an optional layer (3) formed from an EVOH;

optionally, a tie layer (this does not exist if no layer (3) is present);

an inner layer (4) formed from a polyamide (A)/polyolefin (B) blend having a polyamide matrix and containing carbon nanotubes; the layers being successive and adhering to one another in their respective areas of contact.

With regard to the outer layer (1) made of PA-11 or PA-12, these polyamides advantageously have a number-average molecular mass $\overline{M}_n$ of generally greater than or equal to 5000. Their inherent viscosity (measured at 20° C. for a 0.5 g specimen in 100 g of meta-cresol) is generally greater than 0.7.

Advantageously, this polyamide of the outer layer is plasticized by standard plasticizers, such as N-butylbenzenesulphonamide (BBSA) and copolymers comprising polyamide blocks and polyether blocks. These copolymers comprising polyamide blocks and polyether blocks have already been described above in the section relating to the polyamide (A).

With regard to the tie layer (2), this thus defines any product allowing good adhesion between the layers in question. The tie is advantageously chosen from copolyamides and functionalized polyolefins.

By way of example of ties based on functionalized polyolefins, mention may be made of polyethylene, polypropylene, copolymers of ethylene with at least one alpha-olefin, blends of these polymers, all these polymers being grafted by unsaturated carboxylic acid anhydrides, such as for example maleic anhydride, or blends of these grafted polymers and these nongrafted polymers;

copolymers of ethylene with at least one product chosen from (i) unsaturated carboxylic acids, their salts, their esters, (ii) vinyl esters of saturated carboxylic acids, (iii) unsaturated dicarboxylic acids, their salts, their esters, their half-esters, their anhydrides and (iv) unsaturated epoxides, these copolymers possibly being grafted by unsaturated dicarboxylic acid anhydrides, such as maleic anhydride, or unsaturated epoxides, such as glycidyl methacrylate.

With regard to the copolyamide-type ties, the copolyamides that can be used in the present invention have a melting point (DIN 53736B standard) of between 60 and 200° C. and their relative solution viscosity may be between 1.3 and 2.2 (DIN 53727 standard; solvent: m-cresol; concentration: 0.5 g/100 ml; temperature: 25° C.; Ubbelohde viscometer). Their melt rheology is preferably similar to that of the materials of the outer and inner layers.

The copolyamides derive, for example, from the condensation of alpha,omega-aminocarboxylic acids, of lactams or of dicarboxylic acids and diamines.

According to a first type, the copolyamides result from the condensation of at least two alpha,omega-aminocarboxylic acids or of at least two lactams having from 6 to 12 carbon atoms or of a lactam and of an aminocarboxylic acid not having the same number of carbon atoms, in the possible presence of a chain stopper which may, for example, be a monoamine or a diamine or a monocarboxylic acid or a dicarboxylic acid. Among chain stoppers, mention may be made in particular of adipic acid, azelaic acid, stearic acid and dodecanediamine. The copolyamides of this first type may also include units which are residues of diamines and dicarboxylic acids.

By way of examples of dicarboxylic acids, mention may be made of adipic acid, nonanedioic acid, sebacic acid and dodecanedioic acid.

By way of examples of alpha,omega-aminocarboxylic acids, mention may be made of aminocaproic acid, aminoundecanoic acid and aminododecanoic acid.

By way of examples of lactams, mention may be made of caprolactam and lauryllactam (2-azacyclotridecanone).

According to a second type, the copolyamides result from the condensation of at least one alpha,omega-aminocarboxylic acid (or a lactam), at least one diamine and at least one dicarboxylic acid. The alpha,omega-aminocarboxylic acid, the lactam and the dicarboxylic acid may be chosen from those mentioned above.

The diamine may be a branched, linear or cyclic aliphatic diamine or else an aryl-type diamine.

By way of examples, mention may be made of hexamethylenediamine, piperazine, isophoronediamine (IPD), methylpentamethylenediamine (MPDM), bis(amino-cyclohexyl) methane (BACM) and bis(3-methyl-4-amino-cyclohexyl) methane (BMACM).

The processes for manufacturing copolyamides are known in the prior art and these copolyamides may be manufactured by polycondensation, for example in an autoclave.

According to a third type, the copolyamides are a blend of a 6/12 copolyamide rich in 6 and of a 6/12 copolyamide rich in 12. As regards the blend of 6/12 copolyamides, one comprising by weight more 6 than 12 and the other more 12 than 6, the 6/12 copolyamide results from the condensation of caprolactam with lauryllactam. It is clear that "6" denotes the units derived from caprolactam and "12" denotes the units derived from lauryllactam. It would not be outside the scope of the invention if the caprolactam were to be completely or partly replaced with aminocaproic acid, and likewise for the lauryllactam, which may be replaced with aminododecanoic acid. These copolyamides may include other units, provided that the ratios of the 6 and 12 proportions are respected.

Advantageously, the 6-rich copolyamide comprises, by weight, 60 to 90% of 6 per 40 to 10% of 12, respectively.

Advantageously, the 12-rich copolyamide comprises, by weight, 60 to 90% of 12 per 40 to 10% of 6, respectively.

As regards the proportions of the 6-rich copolyamide and of the 12-rich copolyamide, these may be, by weight, from 40/60 to 60/40 and preferably 50/50.

These copolyamide blends may also include up to 30% by weight of other (co)polyamides or grafted polyolefins per 100 parts of 6-rich and 12-rich copolyamides.

These copolyamides have a melting point (DIN 53736B standard) of between 60 and 200° C. and their relative solution viscosity may be between 1.3 and 2.2 (DIN 53727 standard; solvent: m-cresol; concentration: 0.5 g/100 ml; temperature: 25° C.; Ubbelohde viscometer). Their melt rheology is preferably similar to that of the materials of the adjacent layers. These products are manufactured using standard techniques for polyamides. Some processes are described in U.S. Pat. Nos. 4,424,864, 4,483,975, 4,774,139, 5,459,230, 5,489,667, 5,750,232 and 5,254,641.

If the outer layer is made of PA-11, it is preferred that the tie between this PA-11 layer and the EVOH layer (or between the PA-11 layer and the layer (4)) be based on functionalized polyolefins. If the outer layer is made of PA-12, it is preferred that the tie between this PA-12 layer and the EVOH layer (or between the PA-12 layer and the layer (4)) be based on a copolyamide.

With regard to the optional layer (3) formed from an EVOH, this may consist of EVOH or of an EVOH-based blend. EVOH is also referred to as a saponified ethylene/vinyl acetate copolymer. The saponified ethylene/vinyl acetate copolymer to be used according to the present invention is a copolymer having an ethylene content of 20 to 70 mol %, preferably 25 to 70 mol %, the degree of saponification of its vinyl acetate component not being less than 95 mol %. With an ethylene content of less than 20 mol %, the barrier properties under high-humidity conditions are not as high as would be desired, whereas an ethylene content exceeding 70 mol % results in reduced barrier properties. When the degree of saponification or hydrolysis is less than 95 mol %, the barrier properties are sacrificed.

The term "barrier properties" is understood to mean the impermeability to gases and liquids, and in particular to oxygen and to petrol for motor vehicles.

Among these saponified copolymers, those that have melt flow indices within the range from 0.5 to 100 g/10 minutes are particularly useful. Advantageously, the MFI (Melt Flow Index) is chosen to be between 5 and 30 (g/10 min at 230° C./2.16 kg).

It will be understand that this saponified copolymer may contain small proportions of other comonomer ingredients, including α-olefins, such as propylene, isobutene, α-octene, α-dodecene, α-octadecene, etc., unsaturated carboxylic acids or their salts, partial alkyl esters, complete alkyl esters, nitriles, amides and anhydrides of the said acids, and unsaturated sulphonic acids or their salts.

As regards the EVOH-based blends, these are such that the EVOH forms the matrix, that is to say it represents at least 40%, and preferably at least 50%, by weight of the blend. The other constituents of the blend are chosen from polyolefins, polyamides and optionally functional polymers.

With regard to the optional tie layer between the layers (3) and (4), this may be chosen from the ties mentioned in the case of the layer (2).

With regard to the layer (4), this has already been described above.

According to a variant, the layer (4) is replaced with a layer (4a) and a layer (5), such that:
- the layer (4a) is formed from a polyamide (A1) or a polyamide (A)/polyolefin (B) blend having a polyamide matrix but does not contain carbon nanotubes;
- the layer (5) is placed on the inside of the tube and is formed from a polyamide (A)/polyolefin (B) blend having a polyamide matrix and contains carbon nanotubes;
- an optional tie layer being placed between the layers (4a) and (5).

In this variant, the layer (4a) may be of the same composition as the layer (4), except that it does not contain carbon nanotubes.

The layer (4a) may also be made of another polyamide (A1). (A1) may be chosen from the polyamides mentioned in the description of the polyamide (A) of the polyamide (A)/polyolefin (B) blend. As examples of (A1), mention may be made of PA-6, PA-6,6 and PA-6/6,6.

The layer (4a) may also be made of a polyamide/polyolefin blend different from that of the layer (4). For example, it may be made of PA-6 containing EPR (or EPDM), it being possible for the EPR (or EPDM) to be partly or completely grafted by maleic anhydride.

As regards the optional tie layer placed between the layers (4a) and (5), this may be chosen from the ties mentioned in the case of layer (2).

Advantageously, the tube according to the invention has an outside diameter ranging from 6 to 12 mm and a total thickness of 0.41 mm to 1.7 mm, comprising:
- a thickness of 300 to 800 μm for the outer layer (1) made of nylon-11 or nylon-12;
- a thickness of 10 to 100 μm for the tie layer (2);
- a thickness of 10 to 200 μm for the optional EVOH layer (3);
- a thickness of 10 to 100 μm for the optional tie layer; and
- a thickness of 100 to 500 μm for the layer (4) formed from a polyamide/polyolefin blend containing carbon nanotubes.

According to the variant in which the layer (4) is replaced with a layer (4a) and a layer (5), the sum of the thicknesses of the layers (4a), (5) and the optional tie layer between these layers is between 100 and 500 μm.

Preferably, the tubes for connecting the tank to the injection system of the motor vehicles has an outside diameter of 8 mm and a thickness of 1 mm.

These multilayer tubes may be constant-diameter or annulate cylinders.

Conventionally, these tubes may include protective sheaths, especially made of rubber, in order to protect them from engine hot spots.

EXAMPLES

Polyamide/polyolefin blends containing carbon nanotubes according to the invention were produced by compounding in an extruder. The permeability to petrol (at 60° C.) was then measured on films 150 μm in thickness.

The following products were used:
Orgalloy 1: this denotes a polyamide/polyolefin blend, consisting, by weight, of:
25% of a high-density polyethylene (HDPE),
10% of a blend of a polyethylene (C1), which is an HDPE, and a polymer (C2), which is an EPR, the (C1)+(C2) blend being cografted by maleic anhydride,
65% of PA-6;
Orgalloy 1+2% CNT: blend according to the invention containing, by weight, 98% Orgalloy 1 and 2% carbon nanotubes;
Orgalloy 1+6% CNT: blend according to the invention containing, by weight, 94% Orgalloy 1 and 6% carbon nanotubes;
CNT: carbon nanotubes supplied by Hyperion® Catalysis International of the multiwalled type and having a diameter of 15 nanometers.

The results are given in Table 1

TABLE 1

|  | Orgalloy 1 Flow in g · mm/m²/24 h | Orgalloy 1 + 2% CNT Flow in g · mm/m²/24 h | Orgalloy 1 + 6% CNT Flow in g · mm/m²/24 h |
|---|---|---|---|
| Methanol | 136.2 | 104.0 | 87.3 |
| Toluene | 13.1 | 21.2 | 25.6 |
| Isooctane | 0.343 | 0.857 | 3.048 |
| M15 | 149.6 | 126.1 | 116.0 |

The addition of 6% of CNT results in a 22% decrease in the permeability to M15 petrol. M15 petrol contains, by volume, 15% methanol, 42.5% toluene and 42.5% isooctane. However, it should be noted that this decrease is mainly due to the substantial reduction in the permeability to the lightest component and that having the most affinity with Orgalloy 1 (namely methanol), the permeability to toluene and to isooctane increasing with the content of CNT in Orgalloy 1.

The surface resistivity was also measured, comparing Orgalloy 1 with a PA-6. The results are given in FIG. 1.

The surface resistivity is defined as the intensity of the DC electric field divided by the linear current density in a surface layer of an insulating material. In practice, the surface resistivity $\rho_s$ is taken to be equal to the surface resistance $R_s$ reduced to a square area.

Formula:

$$\rho_s \ (ohms) = R_s \ (ohms) \times 1(cm)/d(cm)$$

in which:
l is the length of the facing electrodes
d is the distance between these electrodes.

Surface Resistivity on Plaques:
For our measurement cell, l and d were such that:
l: perimeter of the guarded electrode;
d: distance between guarded electrode and guard electrode;

$l/d = 53.4$

For example, with a measured $R_s$ of $10^6$ ohms, a value of $\rho_s = 10^6 \times 53.4 = 53.4 \cdot 10^6$ ohms was obtained.

Surface Resistivity on Tubes:

The measurement was carried out on the inner layer of tubes having the following dimensions:

Ø: diameter of the tube 0.6 cm;

d: length of the tube 10 cm.

With a measured $R_s$ of $10^6$ ohms, a value of $\rho_s = 10^6 \times (\text{Ø}\pi)/d = 0.18 \cdot 10^6$ ohms was obtained.

Tubes according to the invention having an inside diameter of 0.6 cm, a thickness of 1 mm and comprising, in succession from the outside inwards, layers in the following materials were produced:

PA-12/blend of 6/12 copolyamide rich in 6 and of 6/12 copolyamide rich in 12/EVOH/Orgalloy 1/orgalloy+ CNT.

The surface resistivity of the inner layer was then measured using the above method.

What is claimed is:

1. A method for improving barrier properties of a structure to alcohol-containing fuels comprising:
   a) forming a structure consisting of the following successive layers which adhere to one another in their respective areas of contact:
      1) an outer layer (1) formed from a polyamide chosen from PA-11 and PA-12;
      2) a tie layer (2) made of one or more copolyamides;
      3) an optional layer (3) formed from an EVOH;
      4) an optional a tie layer that does not exist if no layer (3) is present; and
      5) an inner layer (4) formed from a polyamide/polyolefin blend having a polyamide matrix, containing 0.1 to 10% carbon nanotubes per 90 to 99.9% polyamide/polyolefin blend, wherein said carbon nanotubes are tubes or hollow fibres having a diameter of about 5 to 20 nanometers (nm) and a length of 100 to 1000 times the diameter, wherein said polyamide portion of the polyamide/polyolefin blend is from 40 to 75 percent by weight of said blend, and the polyolefin portion of the polyamide/polyolefin blend is from 25 to 60 percent by weight, and wherein said carbon nanotubes concentrate in the polyamide, wherein said inner layer has both good barrier properties to alcohol-containing fuels and antistatic properties;
   b) exposing said structure to an alcohol containing fuel.

2. The method according to claim 1, in which the proportion of nanotubes by weight is between 1 and 7% per 99 to 93% of the polyamide/polyolefin blend of layer (4), respectively.

3. The method according claim 2, in which the proportion of nanotubes by weight is between 2 and 6% per 98 to 94% of the polyamide/polyolefin blend of the inner layer (4), respectively.

4. The method according to claim 1 wherein the composition comprising said polyamide/polyolefin blend of the inner layer (4) further comprises an additive selected from the group consisting of dyes, pigments, whiteners, antioxidants and UV stabilizers.

5. The method of claim 1 wherein said structure is selected from the group consisting of bottles, tanks, containers, hoses, pipes and vessels.

6. The method of claim 1 wherein said inner layer (4) having a composition comprising a polyamide/polyolefin blend is directly in contact with an alcohol-containing fuel.

7. The method according to claim 1, wherein the inner layer (4) is replaced with a layer (4a) and a layer (5), such that:
   the layer (4a) that does not contain carbon nanotubes and which is formed from a polyamide (A1) or a polyamide (A)/polyolefin (B) blend having a polyamide matrix;
   an optional tie layer; and
   the layer (5) is placed on the inside of the tube and is formed from a polyamide/polyolefin blend having a polyamide matrix containing 0.1 to 10% carbon nanotubes per 90 to 99.9% polyamide/polyolefin blend, wherein the carbon nanotubes are tubes or hollow fibers having a diameter of about 5 to 20 nanometers and a length of 100 to 1000 times the diameter, wherein said polyamide portion of the polyamide/polyolefin blend is from 40 to 75 percent by weight of said blend, and the polyolefin portion of the polyamide/polyolefin blend is from 25 to 60 percent by weight, and wherein said carbon nanotubes concentrate in the polyamide, wherein said layer (5) has both good barrier properties to alcohol containing fuels and antistatic properties.

8. The method according to claim 7 wherein the optional tie layer placed between the layers (4a) and (5) is made of copolyamides.

9. The method according to claim 7, in which the proportion of nanotubes by weight is between 1 and 7% per 99 to 93% of the polyamide/polyolefin blend of the layer (5), respectively.

10. The method according claim 7, in which the proportion of nanotubes by weight is between 2 and 6% per 98 to 94% of the polyamide/polyolefin blend of the layer (5), respectively.

11. The method according to claim 7 wherein the composition comprising said polyamide/polyolefin blend of the layer (5) further comprises an additive selected from the group consisting of dyes, pigments, whiteners, antioxidants and UV stabilizers.

12. The method of claim 7 wherein said structure is selected from the group consisting of bottles, tanks, containers, hoses, pipes and vessels.

13. The method of claim 7 wherein said layer (5) having a composition comprising a polyamide/polyolefin blend is directly in contact with an alcohol-containing fuel.

14. The method according to claim 1 wherein the optional tie layer between the layers (3) and (4) is made of copolyamides.

* * * * *